L. LANGHAAR.
ANTIFRICTION BEARING.
APPLICATION FILED MAY 8, 1917.

1,310,756.

Patented July 22, 1919.

INVENTOR.
Louis Langhaar,
BY
Arthur B. Jenkins
ATTORNEY.

UNITED STATES PATENT OFFICE.

LOUIS LANGHAAR, OF CINCINNATI, OHIO.

ANTIFRICTION-BEARING.

1,310,756.   Specification of Letters Patent.   Patented July 22, 1919.

Application filed May 8, 1917. Serial No. 167,336.

*To all whom it may concern:*

Be it known that I, LOUIS LANGHAAR, a citizen of the United States, residing at Cincinnati, in the county of Hamilton and State of Ohio, have invented a new and Improved Antifriction-Bearing, of which the following is a specification.

My invention relates to the class of devices above named, and an object of my invention, among others, is to provide a bearing of this type that shall have particularly efficient means for retaining the balls on predetermined paths of travel.

One form of bearing embodying my invention and in the construction and use of which the objects herein set out, as well as others, may be attained, is illustrated in the accompanying drawings, in which—

Figure 1:
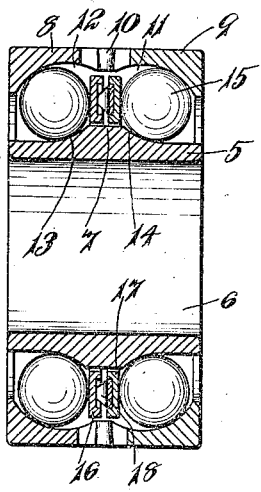
Figure 1 is a view in central section through my improved anti-friction bearing on plane passing lengthwise through the axis.

In certain types of anti-friction bearings the ball races contained in the members of the ball case are flared in one direction laterally to the circular line of travel of the balls, the latter being held upon their paths of movement by restraining members. Such a device is shown in my Patent No. 1199577, dated September 26th, 1916, and the device forming the subject matter of the present case is an improvement upon the device of said patent and has to do with the means for retaining the balls upon the paths of travel which it is designed they shall occupy.

In the accompanying drawings the numeral 5 denotes the inner or cone member of a bearing that is provided with the usual opening 6 and that has a rib 7 forming a double cone. The outer member or case is preferably composed of two parts 8—9 that are locked together in any desired manner, tapered pins 10 being shown herein for this purpose. The construction of the inner member and of the outer member or ball case, however, is not material to my invention, nor are the means for introducing the balls, and my invention is, therefore, not limited to a bearing of any special construction nor to one having any special means for accomplishing this purpose.

In the device herein shown a double ball race is provided, that is, a race for two sets of balls, the members 8—9 being provided with shallow grooves 11—12 located opposite depressions 13—14 on opposite sides of the rib 7, which grooves and depressions together form the raceways for balls 15. The grooves and depressions just mentioned are of such form that they increase in width from the lines on which it is designed that the balls shall travel toward each other, that is, they flare in this direction, so that the balls of each set, if unrestrained, would be free to move toward the other set of balls. It is essential, however, that the balls shall be maintained upon the circular lines marking their paths around the inner or cone member and the outer or case member of the bearing, and, moreover, that this holding element shall be yielding so that the balls will not be rigidly held on these paths of travel but will be permitted a lateral movement sufficient to relieve them from any rigidity or stiffness in their rolling movement, and so that the latter shall be free and easy.

Such a device is shown in the accompanying drawings, this device consisting of two rings 16, duplicates of each other. These rings comprise a restraining member to position the balls upon their paths of travel in the raceways and said rings are set a sufficient distance apart to have a slight yielding movement toward and from each other. They are retained in contact with the ball sets as by means of a spring or springs, located between the rings and normally pressing them apart, these springs being so arranged that they are compressed in order to create the force that they exert upon the rings.

Figure 2:
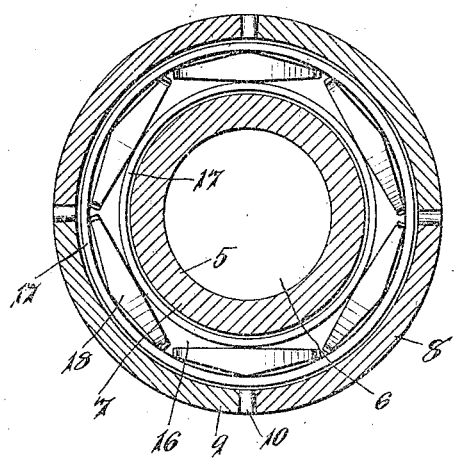
Fig. 2 is a view in cross section through said bearing.
Figure 3:
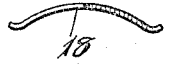
Fig. 3 is a detail edge view of one of the springs.

In the structure shown in Figs. 1, 2 and 3, each section 16 of the restraining member has a groove formed by flanges 17, within which groove a number of springs 18 are contained. In this construction of the device these springs are preferably of diamond shape, as shown in Fig. 2 of the drawings, or other suitable form that will accomplish the purpose, and when unrestrained they assume a bowed form as shown in Fig. 3.

When the two sections 16 of the restraining member containing the springs are placed between the rows of balls the springs will be compressed to a certain extent and their tendency to assume their full original bowed form will force the sections of the retainer into contact with the balls and hold them in this position.

Figure 4:
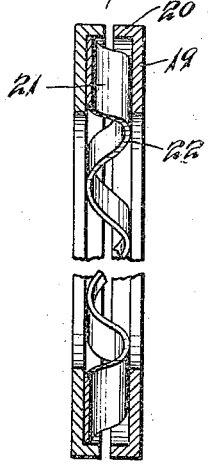
Fig. 4 is a fragmental view in central section through the restraining member of my improved bearing showing a slightly different structure from that of Figs. 1 and 2.

In the form of structure shown in Fig. 4 the sections 19 of the rings have each an outer flange 20, the inner flange shown in the structure of Fig. 1 being omitted. In this structure of Fig. 4 a single spring 21 is provided, this spring being undulated in form and comprising a number of curves 22. This spring is preferably of annular shape, but it will be understood that my invention is not restricted to any special form of the sectional members of the restrainer nor to any special form of the springs, so long as the latter exert their force by a tendency to return to their normal shape from a compressed condition, and so long as the sections of the restraining member are properly formed to hold the springs in place.

The flanges 17 and 20 serve as stops to prevent the sections of the restraining member from approaching so closely together as to injure the springs, but I contemplate other means for accomplishing this purpose as within the spirit and intent of the invention, and the latter is, therefore, not limited to the means specifically herein shown and described.

It is, of course, impossible from a theoretical standpoint, to build a perfect mechanical structure, and especially a ball bearing, and it is the purpose of my present invention to construct a bearing that shall approach perfection to a maximum degree and that shall have means for counteracting the imperfections in structure. These structures are subject to changes by reason of variations in temperature that cause change of dimensions, and these variations in temperature are readily affected by conditions in use. The first movement of a bearing starts wear, which is cumulative and progressive in an increasing ratio. These various errors, arising from unavoidable imperfections in structure and from conditions of use, although originally so small as to appear negligible, are nevertheless insidious and fatal unless constantly and perfectly corrected as they occur, and my improved bearing seeks to overcome these defects by providing a flexible and properly proportioned adjusting means to exert a constant influence toward correcting any errors promptly upon their occurrence.

In accordance with the provisions of the patent statutes, I have described the principles of operation of my invention, together with the apparatus which I now consider to represent the best embodiment thereof; but I desire to have it understood that the device shown is only illustrative, and that the invention can be carried out by other means.

I claim—

1. An anti-friction bearing comprising inner and outer bearing members having a double ball race between them with two rows of balls in said races, and a restraining member placed between said rows of balls and having location therebetween in a circular direction free and independent of all other parts of the structure, said restraining member comprising two sections forming an annular recess between them, and means inclosed within said recess for forcing the sections into contact with the rows of balls.

2. An anti-friction bearing comprising inner and outer bearing members having a double ball race between them with two rows of balls in said races, and a restraining member placed between said rows of balls and comprising two sections, and a spring compressed between said sections and acting to force the sections into contact with the ball rows.

3. An anti-friction bearing comprising inner and outer bearing members having a double ball race between them with two rows of balls in said races, and a restraining member placed between said rows of balls and having location therebetween in a circular direction free and independent of all other parts of the structure, said restraining member comprising two sections, and a spring compressed between said sections and acting to force them into contact with the rows of balls.

4. An anti-friction bearing comprising inner and outer bearing members having a double ball race between them with two rows of balls in said races, and a restraining member placed between said rows of balls and having location therebetween in a circular direction free and independent of all other parts of the structure, and a spring placed between said sections and exerting its force in lines substantially parallel with the axis of the bearing to force said sections into contact with the rows of balls.

5. An anti-friction bearing comprising inner and outer bearing members having a double ball race between them with two rows of balls in said races, and a restraining member placed between said rows of balls and having location therebetween in a circular direction free and independent of all other parts of the structure, said restraining member comprising two sections, a spring compressed by and between the sections to force them apart and into contact with the rows of balls, and means for limiting the movement of said sections toward each other.

6. An anti-friction bearing comprising inner and outer bearing members having a double ball race between them with two rows of balls in said races, and a restraining member placed between said rows of balls and having location therebetween in a circular direction free and independent of all other parts of the structure, said restraining member comprising two sections, and a series of springs of bowed form compressed between said sections and acting to force them apart.

7. An anti-friction bearing comprising inner and outer bearing members having a double ball race between them with two rows of balls in said races, and a restraining member placed between said rows of balls, said restraining member comprising two sections with an annular flange integral with one of said sections to limit movement of the sections toward each other, and a spring located between the sections to force them into contact with the rows of balls.

8. An anti-friction bearing comprising an inner and an outer bearing member having a double ball race between them with two rows of balls in said races, and a restraining member placed between said rows of balls and comprising two sections, and a spring placed between said section and exerting its force in lines substantially parallel with the axis of the bearing to force said sections into contact with the rows of balls.

9. An anti-friction bearing comprising inner and outer bearing members having a double ball race between them with two rows of balls in said races, and a restraining member placed between said rows of balls and comprising two sections, and a series of springs of bowed form compressed between said sections and acting to force them apart.

10. An anti-friction bearing comprising inner and outer bearing members having a double ball race between them with two rows of balls in said races, and a restraining member placed between said rows of balls and comprising two sections each having a groove facing the other section, and a spring located in said grooves to force the sections into contact with the rows of balls.

11. An anti-friction bearing comprising inner and outer bearing members having a double ball race between them with two rows of balls in said races, and a device having free circular location in reference to the ball rows and comprising a resilient portion compressed by the pressure of the ball rows and reacting to keep the balls in contact with the races.

LOUIS LANGHAAR.